United States Patent
Hasselbach

(10) Patent No.: US 11,882,853 B2
(45) Date of Patent: Jan. 30, 2024

(54) WATER ADDITIVE AND COMPOSITION

(71) Applicant: INTEGENE (PTY) LIMITED, Edenvale (ZA)

(72) Inventor: Leigh-Ann Hasselbach, Edenvale (ZA)

(73) Assignee: INTEGENE (PTY) LIMITED, Edenvale (ZA)

( * ) Notice: Subject to any disclaimer, the term of this patent is extended or adjusted under 35 U.S.C. 154(b) by 695 days.

(21) Appl. No.: 16/772,774

(22) PCT Filed: Dec. 18, 2018

(86) PCT No.: PCT/IB2018/060230
§ 371 (c)(1),
(2) Date: Jun. 13, 2020

(87) PCT Pub. No.: WO2019/123233
PCT Pub. Date: Jun. 27, 2019

(65) Prior Publication Data
US 2020/0315216 A1 Oct. 8, 2020

(30) Foreign Application Priority Data
Dec. 18, 2017 (ZA) ..................................... 2020110

(51) Int. Cl.
| | |
|---|---|
| *A23K 50/75* | (2016.01) |
| *A23K 20/142* | (2016.01) |
| *A23K 20/158* | (2016.01) |
| *A23K 20/163* | (2016.01) |
| *A23K 20/24* | (2016.01) |
| *A23K 50/80* | (2016.01) |
| *A23K 10/18* | (2016.01) |

(52) U.S. Cl.
CPC .............. *A23K 50/75* (2016.05); *A23K 10/18* (2016.05); *A23K 20/142* (2016.05); *A23K 20/158* (2016.05); *A23K 20/163* (2016.05); *A23K 20/24* (2016.05); *A23K 50/80* (2016.05)

(58) Field of Classification Search
None
See application file for complete search history.

(56) References Cited

U.S. PATENT DOCUMENTS

| | | | |
|---|---|---|---|
| 3,615,650 A * | 10/1971 | Smith .................... | A23K 50/75 426/807 |
| 10,959,942 B2 * | 3/2021 | Sandvang ............ | A61K 38/465 |
| 2011/0027387 A1 | 2/2011 | Olsen | |

FOREIGN PATENT DOCUMENTS

| | | |
|---|---|---|
| EP | 3020284 A1 | 5/2016 |
| WO | 2013165566 A1 | 11/2013 |
| WO | 2014159185 A1 | 10/2014 |

OTHER PUBLICATIONS

Vandeplas et al. "Efficiency of a Lactobacillus plantarum-xylanase combination on growth performances, microflora populations, and nutrient digestibilities of broilers infected with *Salmonella typhimurium*." Poultry Science, 2009, vol. 88, pp. 1643-1654.*

Scholfield. "Composition of soybean lecithin". Journal of the American Oil Chemist Society. 1981, vol. 58, issue 10, pp. 889-892, abstract.*

Azoulay ety al. "Comparison of the mineral contents of tap water and bottled water". J Gen Intern Med 2001, 16, pp. 168-175; see tables 1-).*

* cited by examiner

*Primary Examiner* — Vera Afremova
(74) *Attorney, Agent, or Firm* — SALIWANCHIK, LLOYD & EISENSCHENK

(57) ABSTRACT

The present invention relates to a feed supplement for addition to drinking water, for improved animal health. The feed supplement includes short chain fatty acids, a nitrogenous compound, a source of inositol and a source of xylanase. The feed supplement reduces the need for pharmaceutical inputs and increases both animal health and yield.

10 Claims, No Drawings

WATER ADDITIVE AND COMPOSITION

CROSS REFERENCE TO RELATED APPLICATIONS

This application is a National Stage Application of International Application Number PCT/IB2018/060230, filed Dec. 18, 2018; which claims priority to the Netherlands Application No. 2020110, filed Dec. 18, 2017.

FIELD OF APPLICATION OF THE INVENTION

The present invention relates to a water additive for addition to drinking water, and more specifically a feed supplement for addition to drinking water containing both nutritive and microbiological components, for improved animal health.

BACKGROUND TO THE INVENTION

Farm animals raised in extensive systems are known to suffer from a number of issues, most related to the density at which they are raised, which may impact their health and overall yield. The first is disease, which spreads rapidly amongst close-packed (and often highly genetically homogenous) animals and can induce both mortality and yield loss. The second major issue is related to the composition and processing of feed, which is often lacking in essential micronutrients necessary for optimal health. The third issue is the environment, which often limits the movement of the animals and induces stress due to overcrowding and/or lack of species-appropriate social interaction. This stress together with other environmental stress factors such as rising global temperatures leads to marked increase in inflammatory markers affecting the production performance factors required to sustain agriculture Traditional approaches, as known in the art, concentrate on minimising these issues in a piecemeal fashion. Widespread use of antibiotics amongst farmers (often at low doses due to their stimulatory effect on growth) has led to widespread antibiotic resistance amongst common pathogenic bacteria, as well as increasing push-back from a public leery of the potential follow-on effects which may be associated with consuming trace amounts of these chemicals in meat on an ongoing basis.

A well-studied and economically important example of these issues can be found in the systems used for extensive rearing of broiler chickens. Here, the exigencies of economies of scale have resulted in extensive farming systems which rely heavily on pharmaceutical intervention (principally antibiotics) and mechanisation to improve the health and yield of densely-packed animals raised on cost-minimising feeds carefully formulated with an eye to nutrient requirements. The size and ubiquitous nature of the industry has led to increasingly small margins for the producers selling their product in a crowded marketplace. This has compounded the trend towards ever larger and more intensive systems, and made the issues of disease control and affordable yield increases ever more pressing.

An aspect of the abovementioned issues which has only recently become apparent is the role of gut microflora in control of pathogenic microorganisms, uptake of nutrients and overall animal health. Even in human health, gut microflora has become widely accepted both as a pivotal component of a host of health-related issues, and as a poorly-understood lacuna in our medical knowledge. The microflora of other animals, which are presumed to be just as important as those in humans, remain even more poorly understood. Metabolic communication between the species within the gut is, however, implicated in reducing inflammation, heat stress and increasing antibodies in farmed animals.

Short chain fatty acids (SCFAs) are the primary end products of fermentation of non-digestible carbohydrates (NDCs) that become available to the gut microbiota (Morrison and Preston, 2016). SCFAs are typically produced through sacchrolytic fermentation of carbohydrates that escape digestion and absorption in the intestinal tract. The major products are formate, acetate, propionate and butyrate (Morrison and Preston, 2016).

Organic carboxylic acids are acids of the general structure R—COOH including fatty acids and amino acids. They are commonly identified using their trivial names and usually have the suffix -ic acid. The carboxylate anion (R—COOH$^-$) is usually named with the suffix -ate. Carboxylic acids known in the art include Carbonic acid, Formic acid, Acetic acid, Propionic acid, Butyric acid, Valeric acid, Caproic acid, Enanthic acid, Caprylic acid, Pelargonic acid, Capric acid, Undecylic acid, Lauric acid, Tridecylic acid, Myristic acid, Pentadecylic acid, Palmitic acid, Margaric acid, Stearic acid, Nonadecylic acid and Arachidic acid.

In poultry species the most common bacteria that affect the intestinal health of poultry are *Salmonella, Camphylobacter* and *E. coli*. These species are known to be controlled with beneficial gut lumen bacteria, especially *Lactobacillus*. Here it is known that the effects of carboxylic SCFA produced by these bacteria on negative gut bacteria such as is mentioned can have a very beneficial effect on poultry. SCFA reduce the levels of pathogens in the crop/proventriculus; regulate gut flora, increase digestion of feed to improve performance.

The role of formate in the gut is linked to methanogenesis and appears to naturally be elevated in inflammatory conditions, implicating it's role in reducing inflammation.

Organic SCFAs are antimicrobial in nature and are known to affect predominantly Gram-negative bacteria. SCFAs are known to be produced naturally by Gram positive gut microbes. It is further known that SCFAs exert an extensive influence on host physiology through nutritional, regulatory and immunomodulatory functions and can also affect bacterial fitness as a form of acid stress (Sun and O'Riordan, 2013). Formic acid and formates are known to increase endothelial villi structures and length in poultry. The increase of villi height of different segments of the small intestine may be attributed to the role of the intestinal epithelium as a natural barrier against pathogenic bacteria and toxic substances.

The use of enzymes as feed supplements is known in the art as one of the strategies used to improve the feed value of indigestible feed in poultry. Exogenous enzymes such as endo-1,4 β Xylanase (EC. 3.2.1.8) which belongs to the hemicellulases and are usually incorporated in poultry wheat-based diets to degrade the anti-nutritional arabinoxylans (AX) and the xylan fractions of wheat, which may consequently improve the nutrient uptake and growth of poultry (Vandeplas et, al. 2009)

Inositol is a six carbon sugar, an isomer of glucose and a carbocyclic polyol present in many biological compounds such a phosphatidylinositol (Rucker, et al, 2008) (Sosenko and Bancalari, 2012) (Corrado and Santamaria, 2015). Myo-Inositol, a form of inositol, is abundantly present in plants in phosphorous-containing forms—typically as phytic acid or inositolhexaphosphate (IP6). Many bird species, especially broiler birds are unable to retrieve phytic acid from plants or plant sources due to the lack of the digestive enzyme, phytase, required to remove the phosphate groups. The addition of enzymes, such as phytase (Klopfenstein, et al, 2002), is known in the art. However, the mode of action of phytase reduces the IP6 to either inositolpenta (IP5), tetra- (IP4) and triphosphate (IP3) (also known as phytates). This is different to the isomeric structure of myo-inositol., which is phosphate free.

The most prominent form of inositol ($C_6 H_{12} O_6$) is myo-inositol and was once considered a member of the vitamin B complex (namely Vitamin Bs). Myo-inositol is a component of the plasma membrane and represents a key role in many biological processes including intracellular signalling, intracellular calcium concentration control and cell membrane potential maintenance. Combining feed digestive enzymes and high dose myo-inositol is known in the art to influence gene expression and/or microbial communities in poultry. Myo-inositol is also known to play a role in managing cortisol and corticosterone levels in poultry.

Pathogen-secreted substances are known to cause disturbances in host organism nutrient absorption. Decreasing the concentration of these substances in the gut is accordingly known to lead to increased nutrient digestibility; modifying metabolism and decreasing chronic low-grade inflammatory processes at the intestinal mucosa. Chronic inflammation in poultry (termed "gut burn") is widely known in the art, and contributes to low nutritive effects of indigestible feed stuffs such as phytic acid and arabinoxylans. It is also known to lead to an overgrowth of pathogenic bacteria in the gut, all of which contribute to the increase in disease susceptibility.

*Lactobacillus* species are known in the art to be important components of healthy gut microbiomes. In particular *Lactobacillus plantarum* (*L. plantarum*), unlike other strict anaerobes, is aerotolerant. These organisms lack the catalase enzyme but almost always have superoxide dismutase. *L. plantarum* by nature is able to control negative pathogenic gastrointestinal tract flora through oxygen-dependent killing of pathogens (Prescott et al, 2002). These include anaerobes such as *Mycobacterium* spp., *Escherichia coli* (*E. coli*.), *Listeria* spp., *Clostridium* spp. and Enterobacteriaceae including *Salmonella* spp. (Prescott et al, 2002). According to Vandeplas et. al, 2009, *L. plantarum* probiotic combined with xylanase enzymes have the ability to reduce the effects of *Salmonella typhimurium* through the process of competitive exclusion by addition into feed.

WO2010/117255 describes a feed additive or food supplement formulation obtained from more than one strain of Lactic acid bacteria. This supplement is used to feed monogastric animals. The claimed Lactic acid bacteria are selected from the group comprising *Lactobacillus plantarum*. This patent application further claims an animal feed including nutrients, bacteriocins, vitamin (sic), organic acids or combinations thereof. The claimed vitamin may include vitamin B, while the claimed organic acids may include formic acid, acetic acid and lactic acid. Here it should be noted that the vitamin B and organic acid constituents, while claimed, were not demonstrated. The demonstrated changes in faecal lactic acid bacteria and Enterobacteriaceae count, small intestine morphology and faecal VFA concentration are thus clearly a product of the combination of specific Lactic acid bacterial strains claimed.

Similarly to the above-mentioned patent application; Thahn et al. describe the use of *Lactobacillus* metabolites (produced as a result of feed supplementation with combinations of specific *Lactobacillus* strains) to improve gut health in poultry. This again demonstrates the known benefits of probiotic feed supplementation in improving feed conversion in monogastric animals. As with the above-mentioned patent application, the organic acids measured via faecal VFA concentration (ie: VFAs excreted) are used as a proxy marker of gut microfloral composition and no attempt is made to directly measure the effect of VFA supplementation concentration (ie: VFAs consumed) on gut health, nor to quantify the synergistic effects of probiotic and directly fed nutritional interventions.

Given the above, it is clear that there exists a present need for a non-pharmacological additive or supplement which improves the yield and health of farm animals (specifically poultry) and lowers antibiotic use.

OBJECT OF THE INVENTION

Accordingly, it is an object of the present invention to provide an animal feed supplement which reduces the need for pharmaceutical inputs and provides benefits to both animal health and yield.

SUMMARY OF THE INVENTION

According to a first aspect of the invention, there is provided a feed supplement for addition to drinking water, including:

short chain fatty acids;

a nitrogenous compound;

a source of inositol; and a source of xylanase, wherein the short chain fatty acids are selected from the group comprising formic acid, propionic acid and butyric acid, in any combination the nitrogenous compound is selected from the group comprising ammonia and ammonium propionate, in any combination, the source of inositol is myo-inositol, and the source of xylanase is selected from the group comprising *Lactobacillus plantarum* and isolated xylanase, in any combination.

Here the isolated xylanase would preferably be of the pH-resistant type, as known in the art.

In an embodiment of the invention the feed supplement may further include lactic acid.

In an embodiment of the invention the feed supplement may further include medium chain fatty acids. In a preferred embodiment of the invention the medium chain fatty acids may include lauric acid and palmitic acid.

In an embodiment of the invention the feed supplement may further include bacteria selected from the group comprising *Lactobacillus* spp., *Propionibacterium* spp. and *Bacillus* spp., in any combination.

In an embodiment of the invention, the feed supplement may further include a source of magnesium. In a preferred embodiment, the source of magnesium may be magnesium bisglycinate.

In an embodiment of the invention the feed supplement may be added to drinking water for consumption by farmed animals. In a preferred embodiment the farmed animals may be monogastric animals. In a further preferred embodiment the monogastric animals may be fish. In an alternate embodiment the monogastric animals may be poultry. In a preferred alternate embodiment the poultry may be chickens.

According to a second aspect of the invention there is provided a feed supplement for addition to drinking water for consumption by poultry, the feed supplement comprising:

- between 30% and 50% propionic acid by weight;
- between 5% and 30% lactic acid by weight;
- between 1% and 15% formic acid by weight;
- between 5% and 15% ammonia by weight;
- between 10% and 15% ammonium propionate by weight;
- between 0.1% and 1% magnesium by weight;
- between 0.5% and 3% citric acid by weight;
- between 0.5% and 15% myo-inositol by weight;
- between 1% and 10% *Lactobacillus plantarum* culture by weight; and
- between 0.5% and 6% xylanase by weight.

These and other objects, features and advantages of the invention will become apparent to those skilled in the art following the detailed description of the invention.

DESCRIPTION OF PREFERRED EMBODIMENTS OF THE INVENTION

A non-limiting example of a preferred embodiment of the invention is described in more detail below.

EXAMPLES

Formulation and Testing of Mixture

In order to produce a feed supplement according to an embodiment of the invention, 10-24% Lactic acid (l-lactic acid CAS 79-33-4), 35-50% propionic acid (pure propionic acid CAS 79-09-4) and 2.5-9.9% formic acid (CAS 64-18-6) were combined and neutralised with ammonia (as ammonium hydroxide CP grade) as required to buffer the solution and adjust the initial pH to between 3.2-4.2

All chemicals were purchased from local and global commercial sources.

Carboxylic acids are Brønsted-Lowry acids because they are proton (H+) donors. They are the most common type of organic acid. Carboxylic acids are typically weak acids, meaning that they only partially dissociate into H+ cations and RCOO− anions in neutral aqueous solution. For example, at room temperature, in a 1-molar solution of acetic acid, only 0.4% of the acid molecules are dissociated. pKa was introduced as an index to express the acidity of weak acids, where pKa is defined as follows:

$$pK_a = \log_{10} K_a$$

The above principle was used, with the varying $pK_a$ values of 3.86, 4.87 and 3.75 being applied for lactic, propionic and formic acid respectively at 25° C. Volumes of each acid were then added according to the following formula for final concentration to produce a 1 L solution at 1M and adjusted in water

- between 40% and 50% propionic acid by weight;
- between 15% and 30% lactic acid by weight; and
- between 1% and 15% formic acid by weight.

The solution was then titrated with ammonium ions ($NH_4^+$) as $NH_4OH$ (ammonium hydroxide solution) to provide between 5% and 15% ammonia by volume once at final concentration.

The final base composition pH of this SCFA base mixture was 3.2-4.2.

The base feed supplement mixture, once made up, was then amended by addition of further compounds. These were magnesium (as magnesium bis-glycinate) (Fully reacted magnesium amino acid chelate), inositol (as myo-inositol), and citric acid. The product was locally sourced through commercial sources.

The final concentration of the above ingredients was as follows:

- between 0.1% and 1% magnesium by weight;
- between 0.5% and 3% citric acid by weight; and
- between 0.5% and 15% myo-inositol by weight.

This embodiment of the invention included only *L. plantarum* as a probiotic. The probiotic strain used was purchased commercially. The probiotic was added in liquid form at a final concentration of between 1% and 10% by weight, with xylanase added as at a concentration of between 0.5% and 6% by weight. The strains used were the *Lactobacillus plantarum* strain from CWBI Germany Belgium. However; *L. plantarum* ATCC 1804 was also successfully tested, along with strains from homemade cow's cheese, sheep's cheese and whey obtained from local dairies. Due to its aerotolerant nature, *L. plantarum* was not negatively affected by transport through a water line.

All strains were kept at −80° in a 30% glycerol broth. Dry powders can also be obtained by bacterial fermentation in the relevant culture broths, as known in the art. This embodiment of the invention used MRS broth (De Man, Rogosa and Sharpe) obtained from relevant global suppliers. Fermentation occurred for 24 h at 37° C. The cultures were centrifuged at 8000 rpm for 30 min at 4° C. (7BZ-Neo 1600-001). Before use the viability and biochemical properties of cell counts was determined by API.

Once made up to final concentration, the feed supplement was added to drinking water for poultry. Dosage was achieved by an automated on-farm system or manually through overhead tanks, discharging directly into drinking water, so as to increase bioavailability. Water samples were regularly taken to be measured for pH.

The results of feeding trials on broiler chickens were determined for treatment versus antibiotic and other treatment interventions. Ross 308 and Cobb 500 as hatched birds, raised for broiler production, were used in trials. Table 1. shows a summary of the results.

TABLE 1

Traditional microbial efficacy data results for on-farm trials conducted for treatment and control grouped commercial Ross 308 and Cobb 500 broilers. Treatment groups performed better than antibiotic-treated groups for *Salmonella* spp. efficacy and for *E. coli* spp. efficacy. Experimental groups were raised in separate houses with a capacity of ~20 000 to ~46 000 per house. No detection was found for control and treated birds with regards *Camphylobacter* and *Clostridium perfrigens* spp.

| | Counts % | |
|---|---|---|
| | Treatment | Control |
| *Salmonella* spp | | |
| Count Detected | 1% | 2% |
| Count Not Detected | 99% | 98% |
| *E. coli* | | |
| Percentage difference: Treatment improvement over Control | 69.81% | |

Lighting was maintained constantly in both treatment and control houses. All control and treatment houses were administered feed and water ad libitum.

Treatment houses were typically administered the mixture for days 1-4, days 8-10, days 18-24 and days 28-32 of the test. Treatment can extended for cycles longer than 33 days. On average, control houses were administered treatments for days 1-4 and whenever required as prescribed. All on-farm cycles were tested over a period of 24 months.

The treatment showed improvements of 69.81% for *E. coli* spp efficacy according to the ISO4832:2007 method and performed better in treatment groups for *Salmonella* spp. efficacy, according to the ISO6579:2003 method, as is shown in Table 1.

Surprisingly, the feed supplement was found to both encourage the growth of *Lactobacillus* gut bacteria and decrease or eliminate yeast and moulds (measured in faecal samples), as is verified by 16S Metagenomic analysis, whilst simultaneously preventing the growth of negative gut flora such as *Salmonella* spp, *E. coli*. and Clostridia spp. A large percentage unknown species detection provides for culturing of new bacterial species. It was further surprisingly found that treated houses showed substantial decreased Feed Conversion Ratios (FCR) and higher Production Efficiency Factor standards (PEF) (Table 2). Mortality rates show a 0.8% improvement compared to control houses meaning that the treatment performs as well as and more effectively than a pharmaceutical intervention.

TABLE 2

Summary of consolidated on-farm results comparing treatment and control groups for commercial broilers. Trials were conducted over a 2-year period on real-time commercial farms. Antibiotics were effectively replaced with treatment and improvements in key metrics were observed for treatment groups.

|  | Treatment vs Control |
| --- | --- |
| No. of birds placed per house | 20,000-46,000 |
| Bird breed | Cobb500, Ross 308 |
| Age of flock (in weeks) | 27-68 |
| Key highlights of trial results (all improvement) | |
| Difference in Mortalities % | 0.80% |
| Feed Conversion Ratio | 2.30% |
| Production Efficiency Factor | 0.26% |

16S Bacterial Metagenomic Data Analysis
Methodology

Faecal samples, from control and treatment commercial broiler houses, housing ~40 000 birds each, were randomly collected and placed into sterile collection tubs (100 g).

Samples were transported at 5° C. and were immediately placed into Zymo Research RNA/DNA Shield™ Faecal collection tubes. Samples collected were then ready for the sensitive downstream microbiomic analyses.

Samples were sent to a commercial NGS service provider and genomic DNA was extracted using the ZymoBIOMICS kit. Briefly, genomic DNA samples were PCR amplified using a universal primer pair (341F and 785R—targeting V3 and V4 of the 16S rRNA gene). Resulting amplicons were gel purified, end repaired and Illumina specific adapter sequence were ligated to each amplicon.

Following DNA quantification, the samples were individually indexed, and another bead-based purification step was performed. Amplicons were then sequenced on Illumina's MiSeq platform, using a MiSeq v3 (600 cycle) kit.

20 Mb of data (2×300 bp long paired end reads) were produced for each sample. The BLAST-based data analysis was performed using the laboratory in-house developed data analysis pipeline.

For every sample, data was trimmed and only >q20 (i.e. high quality) reads were used. Every read was BLASTED and the result file saved. The top hit for every BLAST result (i.e. genus and species name) was counted and a record was kept of how many times each species appeared as a hit. The read count is the number of reads that matched to the corresponding organism in Column 1 (organism name/Hit Name). If in the event that no BLAST result was found for a particular read, we recorded that read count under 'No Hits'. Taxa information for every BLAST hit was recorded.

Two treatment protocols were followed to assess the impact of the present invention on the microbiome metagenome. These are outlined below:

Treatment 1: Days 1-5: 4 L: 1000 L, Days 18-20: 4 L:1000 L, Days 25-27: 8 L:1000 L, Days 30-31: 10 L: 1000 L Treatment 2: Days 1-4: 1 L:1000 L, Days 21-24:2 L:1000 L Control: Antibiotic treatment Day 1-4

Results

The 16S RNA results showed a marked increase in Firmicutes, 53.73% for Treatment 1 and 42.27% for Treatment 2, for both treatment protocols and a marked decrease in Actinobacteria and Bacteroidetes, when compared to the control at 2.47% (Table 3). The ratio of Firmicutes/Bacteroidetes (F/B) is important, as Firmicutes are more effective as an energy source than Bacteroidetes by promoting more efficient absorption of calories and subsequent weight gain (Krajmalnik-Brown R, et al, 2012).

It has further been shown that Firmicutes when dominant enrich genes known to be associated with nutrient transportation and overall weight gain, while a higher relative abundance of Actinobacteria and Bacteroidetes and an enrichment of genes linked to carbohydrate metabolism was found in microbiomes of lean phenotypes (Dugas L R, et al, 2016). Carbohydrate metabolism is important in broiler nutrition but due to the anti-nutritional effects of feeding ingredients such as maize and wheat, it is important to concentrate on improving gut microbiomes that are able to improve total nutrient utilisation including the use of fats and proteins to improve body weight gain.

A significant increase in relative abundance of Firmicutes and higher F/B ratio, as is shown in the present invention, is therefore a novel approach to improving broiler feed conversion without pharmaceutical intervention. Traditional therapeutic antibiotic administration may have been associated with increased average live weight (ALW) and weight gains, but this is mainly attributed to carbohydrate metabolism and in view of the threats of increased antibiotic resistance, it will be important to focus on nutritional feeding interventions that improve utilisation of all types of feed including those with higher protein and fat quantities.

TABLE 3

The 16S metagenomic bacterial phyla classification results for analysis for Treatment 1 (Days 1-5: 4 L: 1000 L, Days 18-20: 4 L: 1000 L, Days 25-27: 8 L: 1000 L, Days 30-31: 10 L: 1000 L), Treatment 2 (Days 1-4: 1 L: 1000 L, Days 21-24: 2 L: 1000 L), showing a marked increase in Firmicutes and a marked decrease in Actinobacteria and Bacteroidetes in comparison to control routine therapeutic antibiotic treatment in commercial broilers.

|  | Read Count | % |
|---|---|---|
| Phyla Classification—Control | | |
| Unknown | 66195 | 52.55 |
| Proteobacteria | 31730 | 25.19 |
| Actinobacteria | 22062 | 17.51 |
| Firmicutes | 3106 | 2.47 |
| Cyanobacteria | 1337 | 1.06 |
| Bacteroidetes | 725 | 0.58 |
| Tracheophyta | 487 | 0.39 |
| Phyla Classification—Treatment 1 | | |
| Firmicutes | 28779 | 53.73 |
| Unknown | 23826 | 44.48 |
| Proteobacteria | 910 | 1.70 |
| Actinobacteria | 40 | 0.07 |
| Bacteroidetes | 7 | 0.01 |
| Phyla Classification—Treatment 2 | | |
| Unknown | 32367 | 51.04 |
| Firmicutes | 26802 | 42.27 |
| Actinobacteria | 2549 | 4.02 |
| Proteobacteria | 1570 | 2.48 |
| Bacteroidetes | 68 | 0.11 |

It is observed that Treatment 1 and 2 presented with 40.71% and 53.58% Lactobacillales in comparison to Control 2.38%. The predominant species detected in control samples was Rhodospirillales and Actinomycetes. Actinomycetes for Treatment 2 were 4% and Treatment 1 was 0.04% and Rhodospirillales for Treatment 1 and 2 were 0.02% and 0.01% respectively. We demonstrate here the effect of the present invention and its ability to alter the entire microbiomic infrastructure and have shown the synergistic effect of directly fed nutritional intervention. It is important to note that in the art it may be known that SCFA improve gut health however no known attempt has been made to understand the precise classification changes after feeding of such interventions.

Experiment B was designed to validate the 16S RNA results from Experiment A and only Treatment 1 protocol was used in the design. Here it is noted that Lactobacillales as an order is again the predominant bacterial strain detected. Here it is validated that Lactobacillales is the predominant species after treatment versus control antibiotic treated broiler birds.

It is further noted that both treatment samples presented with higher Lactobacillaceae at 52.95% and 40.28% respectively compared to the control samples at 2.37%. The control samples presented with Acetobacteraceae at 18.29% and Propionibacteriaceae at 14.94%

From both experiments and both order and family classification it is noted that administration with a nutritional intervention containing SCFA and myo-inositol have changed the microbial colonisation of the gut lumen of commercial broiler birds in favour of health enhancing Firmicutes and importantly Lactobacillales spp. High dose administration has accordingly been shown to keep changing the intestinal colonisation pattern in favour Lactobacillus which is known to prevent enteric pathogen gut colonisation. The extent to which these colonisation changes occur has not previously been demonstrated for the feeding of the SCFA combination herein described.

Surprisingly BLAST output results show no Lactobacillus plantarum spp. It is unexpected that the feeding of carboxylic acids would create uniformity within the gut lumen as is presented as is shown for Treatment 1.

Table 4 below shows the BLAST output results for each of the experiments performed where this uniformity is shown. It is maintained that higher dose rates do indeed create more uniformity within the gut and exclusion of negative pathogen species known to negatively effect on-farm metrics such as FCR, PEF and mortality and the associated food production contamination risks.

TABLE 4

The summarised BLAST output results for 16S Metagenomic Analyses for treatment of commercial broiler birds treated with an embodiment of the invention compared to those treated with initial on-farm therapeutic antibiotic dosing.

|  | Read Count | % |
|---|---|---|
| BLAST HIT—Treatment 2 | | |
| uncultured bacterium | 29441 | 44.36 |
| Lactobacillus sp. | 6374 | 9.60 |
| Gallibacterium anatis | 1108 | 1.67 |
| Brachybacterium faecium | 683 | 1.03 |
| Brachybacterium paraconglomeratum | 525 | 0.79 |
| Lactobacillus reuteri | 457 | 0.69 |
| bacterium ii1222 | 378 | 0.57 |
| Halomonas elongata | 323 | 0.49 |
| Corynebacterium glyciniphilum | 279 | 0.42 |
| Weissella thailandensis | 226 | 0.34 |
| Corynebacterium falsenii | 224 | 0.34 |
| BLAST HIT—Treatment 1 | | |
| uncultured bacterium | 23154 | 43.17 |
| Lactobacillus sp. | 8173 | 15.24 |
| Lactobacillus reuteri | 5267 | 9.82 |
| Lactobacillus salivarius | 1395 | 2.60 |
| Lactobacillus aviarius | 362 | 0.67 |
| BLAST HIT Control | | |
| uncultured bacterium | 60476 | 46.65 |
| Acetobacter sp. | 8116 | 6.26 |
| Brevundimonas sp. rp2 | 4934 | 3.81 |
| Lactobacillus salivarius | 1621 | 1.25 |

We have found no resistance to the use of the invention in treating natural commensal avian pathogens. However; it is noted that at lower dose rates of the invention the pathogen Gallibacterium anatis is found at 1.67%. This pathogen is an emerging disease of poultry. Growing concern about G. anatis and its poorly understood growth kinetics, virulence markers, pathogenesis and vaccine(s) to control, make it worth mentioning that we show that at higher dose rates, this bacterium is not present. Gallibacterium anatis (earlier known as Pasteurella anatis) is commensal in upper respiratory tracts and the lower genital tracts of healthy chickens (Singh et al, 2016). Its colonisation in the upper respiratory tract may play a role in virulence of other disease onsets such as Avian Flu strains. We note here that for Treatment 1 there was no 16S RNA genomic evidence of this pathogenic bacteria. We extrapolate that the feeding at higher dose rates plays a role in disease resistance.

Though the infection of G. anatis is treatable with antibiotics, the frequency of treatment failure is an emerging and recurrent problem and multidrug resistant strains of G. anatis have shown resistance to sulpha drugs, novobiocin, tylosin, clindamycin, tetracycline and penicillin. We show here that no resistance is presented at higher dosing rates and that the dose rate is an important consideration when treating with SCFA and probiotic combinations. The feed supplement of the invention is able to effectively prevent new pathogens that are emerging with increased resistance to known antibiotics.

Further Testing of Specific Embodiments of the Invention

A specific embodiment of the invention, made up as described herein above, was tested on broiler chickens. Antibiotic treated houses were used as a positive control. The mixture was made up using the following ratio of constituents:

47.2% propionic acid by weight;
22.45% lactic acid by weight;
8.75% formic acid by weight;
11.55% ammonia by volume;
0.27% magnesium by weight;
1.08% citric acid by weight;
5.41% myo-inositol by weight;
2.24% *Lactobacillus plantarum* culture by weight; and
1.05% xylanase by weight.

RNA Sequencing

RNA sequencing (RNA Seq) also called whole transcriptome shotgun sequencing (WTSS) uses Next Generation Sequencing (NGS) to reveal the presence and quantity of RNA in a biological sample at a given moment in time. RNA Seq is used to analyse the continuously changing cellular transcriptome (Chu and Corey, 2012). It is widely considered now that RNA sequencing is a deep sequencing tool that allows for high coverage and uses the same concepts as DNA sequencing but where the library preparation is quite different (Chu and Corey, 2012). RNA Seq library preparation usually includes reverse transcription. Most importantly RNA Seq facilitates the ability to look at changes in gene expression over time or differences in gene expression in different groups or treatments (Maher et al, 2009).

The aim of the inclusion of RNA Seq for the present invention is to understand which pathways are affected by the presently-used embodiment of the invention and identify novel gene expression pathways not yet understood. To date, since the mapping of the chicken genome in 2004, not much effort has been made to understand and map the enzymes specifically regulating protein function on a proteome level in chicken (USDA database). To this end the present invention, has found novel gene expressions and linked this to novel enzymes in birds treated with the embodiment of the invention.

Reproductive success, nutrition, growth and disease resistance are traits important to industry and an understanding at a molecular level allows researchers to develop further novel products involved in disease. Its known that organic acids play a role in replacement of antibiotics but not in the role they play in the development of disease resistance or reproductive success.

Methodology

For the present invention RNA Seq data was generated in order to establish pathways unknown that are initiated differently between the treated and control birds. Blood samples were collected from 2 birds from each of the control and treated experimental houses. The samples were drawn into DNA/RNA Shield Tubes (Zymo Research Corp, under license by Pangea Laboratory) as 3 ml draws. The same birds were used throughout a 33 day period so as to track the transcriptome data within this period. The sample collection and preparation was designed in order to see changes in gene expression over time and differences between the group treated with routine antibiotics and those treated with an embodiment of the invention as shown in Table 5.

TABLE 5

Sample collection and protocol design for RNA Sequencing analyses in order to ascertain gene expression differences over time and between control (antibiotic) and treated birds. Two birds from each house (pink and green) were sampled for blood over the period of 33 days. Samples were pooled to provide deeper RNA value and randomization.

| CONTROL | | TREATMENT | |
|---|---|---|---|
| sample 1 | day 19, house 2 pink<br>day 19, house 2 green | sample 6 | day 20, house 1 green<br>day 20, house 1 pink |
| sample 2 | day 7, house 2 green<br>day 7, house 2 pink | sample 7 | day 8, house 1 green<br>day 8, house 1 pink |
| sample 3 | day 15, house 2 green<br>day 15, house 2 pink | sample 8 | day 16, house 1 green<br>day 16, house 1 pink |
| sample 4 | day 24, house 2 green<br>day 24, house 2 pink | sample 9 | day 25, house 1 green<br>day 25, house 1 pink |
| sample 5 | day 29, house 2 green<br>day 29, house 2 pink | sample 10 | day 30, house 1 green<br>day 30, house 1 pink |

Sample preparation and protocol was in accordance with the Illumina MiSeq system. Samples were then sent to a commercial NGS service provider and genomic DNA was extracted using the ZymoBIOMICS kit. Briefly, genomic DNA samples were PCR amplified using a universal primer pair (341F and 785R—targeting V3 and V4 of the 16S rRNA gene). Resulting amplicons were gel purified, end repaired and Illumina specific adapter sequence were ligated to each amplicon.

Following DNA quantification, the samples were individually indexed, and another bead based purification step was performed. Amplicons were then sequenced on Illumina's MiSeq platform, using a MiSeq v3 (600 cycle) kit. 20 Mb of data (2×300 bp long paired end reads) were produced for each sample. The BLAST-based data analysis was performed using the laboratory in-house developed data analysis pipeline.

RNA metadata was then to perform heat map analysis. This simultaneously clusters samples and features, showing a two-dimensional heat map of expression values. Here each column corresponds to one sample and each row corresponds to a feature (a gene or transcript). The samples and features are both hierarchically clustered. Known metadata about each sample is added as an overlay. TMM normalization was used to make samples comparable and z-score normalization to make features comparable. The heat map, once generated, was used to identify genes of interest.

Hierarchical clustering clusters features by the similarity of their expression profiles over the set of samples and for the purposes of our investigation the algorithm requires that we specify a distance measure and a cluster linkage in data evaluation. Euclidean distance was the selected distance measure, where the ordinary distance between two points is the length of the segment connecting them.

If $u=(u_1, u_2, \ldots, u_n)$ and $v=(v_1, v_2, \ldots, v_n)$, then the Euclidean distance between u and v is $$|u - v| = \sqrt{\sum_{i=1}^{n} (u_i - v_i)^2} \, .$$

The Cluster linkage selected for the purposes of the present analysis is Complete Linkage, where the distance between two clusters is computed as the maximal object-to-object distance d($x_i$, $y_i$), where $x_i$ comes from the first cluster, and $y_i$ comes from the second cluster. In other words, the distance between the two farthest objects in the cluster.

Mapping tools were used to align the sequences to the chicken reference genome (available at ftp://ftp.ensembl.org/pub/release-94/fasta/gallus_gallus/dna/: Gallus gallus genome build 5, March 2017). Read counts per gene were calculated. In order to exclude genes with very low counts, features with less than 20 reads in at least both control and treatment were excluded Results RNA sequencing yielded an average of 15000 reads per sample. Numbers of differentially abundant transcripts as well as their clustering were visualized. Pathway activation varied between control and treatment groups; where the treatment groups indicate canonical pathway upregulation for heat stress regulation, disease resistance development and nervous system maintenance.

A longitudinal study RNA Seq heat map was generated comparing commercial broiler transcriptomics for treatment with an embodiment of the invention, in comparison to antibiotic treatments. This showed an overall higher expression rate than that of the control groups for key canonical pathway for upregulation in heat stress regulation (HSPA2), disease resistance development (OASL, MACF1, OTUD1, BF1 and BF2) and nervous system maintenance (TMEM184B and EEF2). The present study further demonstrates increased expression of cellular immune pathways by activation of MAP kinase pathways via TMEM184B, MHC Class I antigen via BF1 and BF2, Protein biosynthesis via EEF2 by treatment versus control birds.

These results provide proof of an unexpected effect of the invention in the enhanced upregulation of stress management, disease resistance and nervous system maintenance genes; providing a mechanistic linkage between the results obtained in trials of the invention and the embodiment of the invention itself. The invention accordingly represents a novel and inventive approach for reducing and effectively replacing the need for pharmaceutical inputs, and increases both animal health and yield.

REFERENCES

Chu Y, Corey D R. RNA sequencing: platform selection, experimental design, and data interpretation. Nucleic Acid Therapeutics, 2012, Vol 22, No 4, 271-4.

Dugas L R, Fuller M, Gilbert J, Layden B T. The obese gut microbiome across the epidemiologic transition. Emerging Themes in Epidemiology, 2016, Vol 13, 2.

Klopfenstein T J, Angel R, Cromwell G, Erickson G E, Fox D G, Parsons C, Satter L D, Sutton A L, Baker D H. Animal Diet Modification to Decrease the Potential for Nitrogen and Phosphorus Pollution. Council for Agricultural Science and Technology, 2002.

Krajmalnik-Brown R, Ilhan Z E, Kang D W, DiBaise J K. Effects of gut microbes on nutrient absorption and energy regulation. Nutrition in Clinical Practice, 2012, Vol 27, 201-214.

Maher C A, Kumar-Sinha C, Cao X, Kalyana-Sundaram S, Han B, Jing X, Sam L, Barrette T, Palanisamy N, Chinnaiyan A M. Transcriptome sequencing to detect gene fusions in cancer. Nature, 2009, Vol 458, No 7234, 97-101.

Morrison D J, Preston T. Formation of short chain fatty acids by the gut microbiota and their impact on human metabolism. Gut Microbes, 2016, Vol 7, No 3, 189-200.

Prescott J P, Lansing M, Harley J P, Klein D A. Microbiology $5^{th}$ Edition. McGraw Hill Companies, 2002, 128-129.

Singh S V, Singh B R, Sinha D K, Kumar V O R, Vadhana P A, et al. *Gallibacterium anatis*: An Emerging Pathogen of Poultry Birds and Domiciled Birds. Journal of Veterinary Science and Technology, 2016, Vol 7, 324.

Sun Y, O'Riordan, M X D. Regulation of bacterial pathogenesis by intestinal Short-Chain Fatty Acids. Adv Appl Mircobiol, 2016, Vol 85, 93-118.

Thranh N T, Loh T C, Foo H L, Hair-bejo H, Azhar B K. Effects of feeding metabolite combinations produced by *Lactobaccilus plantarum* on growth performance, faecal microbial population, small intestine villus height and faecal volatile fatty acids in broilers. Brit Poult Sci, 2009, Vol 50, 298-306.

Vandeplas S, Dubois Dauphin R, Thiry C, Beckers Y, Welling G W, Thonart P, Théwis A. Efficiency of a *Lactobacillus plantarum*-xylanase combination on growth performances, microflora populations, and nutrient digestibilities of broilers infected with *Salmonella Typhimurium*. Poul Sci, 2009. Vol 88, No 8, 1643-1654.

Wei S, Morrison M, Yu Z. Bacterial census of poultry intestinal microbiome. Poult Sci, 2013, Vol 92, 671-83.

The invention claimed is:

1. A feed supplement for addition to drinking water for consumption by poultry, the feed supplement comprising:
   between 30% and 50% propionic acid by weight;
   between 5% and 30% lactic acid by weight;
   between 1% and 15% formic acid by weight;
   between 5% and 15% ammonium ions by weight;
   between 0.1% and 1% magnesium by weight;
   between 0.5% and 3% citric acid by weight;
   between 0.5% and 15% myo-inositol by weight;
   between 1% and 10% *Lactobacillus plantarum* culture by weight; and
   between 0.5% and 6% xylanase by weight.

2. The feed supplement of claim 1, wherein the magnesium is magnesium bisglycinate.

3. The feed supplement of claim 1, wherein the poultry is a chicken.

4. The feed supplement of claim 1, wherein the feed supplement further comprises at least one bacteria selected from *Propionibacterium* spp., *Bacillus* spp., and combinations thereof.

5. The feed supplement of claim 1, wherein the ammonium ions are in the form of ammonium hydroxide.

6. The feed supplement of claim 1, wherein the propionic acid is between 35% and 50% by weight.

7. The feed supplement of claim 1, wherein the propionic acid is between 40% and 50% by weight.

8. The feed supplement of claim 1, wherein the lactic acid is between 15% and 30% by weight.

9. The feed supplement of claim 1, wherein the lactic acid is between 10% and 24% by weight.

10. The feed supplement of claim 1, wherein the formic acid is between 2.5% and 9.9% by weight.

* * * * *